United States Patent Office 3,046,140
Patented July 24, 1962

3,046,140
SLICED SWISS CHEESE
Eugene J. Hermann, Glen Ellyn, Ill., assignor to National Dairy Products Corporation, New York, N.Y., a corporation of Delaware
No Drawing. Filed Dec. 30, 1960, Ser. No. 79,587
5 Claims. (Cl. 99—116)

The present invention generally relates to improved Swiss cheese and more particularly it relates to a process for improving the flavor and texture of sliced Swiss cheese after curing.

Swiss cheese, or cheese of the Emmenthaler type, originated in Switzerland but has been made and sold extensively in the United States. In accordance with an Emmenthaler or Swiss process, the cheese may be manufactured by the following general steps:

(1) Inoculate cow's milk with a culture of such type or types of bacteria as are suitable for producing a cheese having the characteristic nutty flavor of Swiss cheese.

(2) Set or coagulate the milk, usually at a temperature between 85° F. and 95° F.

(3) Cut the curd.

(4) Stir the cut curd in the whey, preferably at a temperature of about 120° F. to 138° F.

(5) Separate the curd from the whey.

(6) Press the curd in a form for some hours to eliminate more whey and to knit or consolidate the curd.

(7) Soak the body of curd in brine for a short period of time, e.g., one to four days, at a relatively low temperature, for example, 50° F. to 60° F.

(8) Allow the body to drain, and then store in a cool room, for example, 50° F. to 60° F., for a short period of time, e.g., 4 to 15 days.

(9) Store the curd in a warm room, for example, 65° F. to 80° F., for 2 to 6 weeks, during which time the cheese body cures, i.e., gases are developed in the body by bacterial action, usually resulting in the formation of characteristic cells or eyes within the body, the volume of the body expanding during the curing period because of the formation of such cells within the body structure.

According to the usual procedure, in the manufacture of wheel Swiss cheese, after the curd is drained it is placed in a wheel-shaped form (step No. 6) and subjected to heavy pressure overnight, after which the body of consolidated curd is removed from the form and brined (step No. 7). High quality wheel Swiss cheese prepared in accordance with the preceding manner may contain up to about 2 percent salt, usually around 1.5 to 1.75 percent salt, on the cheese basis. The flavor of the cheese is relatively sharp and nutlike and the texture is relatively brittle, in comparison with block Swiss cheese.

Block Swiss cheese curd is prepared in the same general manner as described above. However, when the curd, after separating from the whey, is pressed (step No. 6) the pressing is carried out in a rectangular form. The curd in rectangular block form may then be salted by being placed into a brine tank or the like.

In the preparation of so-called rindless Swiss block cheese, the outer surfaces of the block are sealed in one of several ways. For example, the cheese blocks may be dipped into a sealing substance or may be wrapped in a suitable wrapping material so as to seal the outside of the block from the atmosphere. The blocks are then cured. A rindless block Swiss cheese is thereby provided, which cheese may have salt at a level of about 1 percent by weight, although the salt may average as low as about 0.3 percent by weight.

Swiss type cheese may be made without the brining step but such cheese has not achieved any commercial significance since the consumer is accustomed to salted Swiss type cheese. As made heretofore, Swiss cheese often had different moisture levels so that the texture of the cheese varied.

It would be advantageous to provide Swiss cheese for the market which has more uniform distribution and levels of salt and moisture throughout conventional wheel Swiss. Wheel Swiss cheese may have a relatively high concentration of salt adjacent the surface of the cheese but a relatively low concentration of salt, such as about 0.25 percent, at the center of the cheese. Moreover, the moisture concentration in the cheese may be higher at the center than at the outer surface thereof. Obviously, uniformity of salt and moisture concentration throughout Swiss cheese would result in a product of improved high quality.

A process has now been discovered whereby improved Swiss cheese having the desired characteristics can be readily produced. In the process, sliced Swiss cheese is treated in a manner which effects substantially uniform distribution of moisture and salt therein. The improved process is relatively simple and inexpensive, and is adaptable to commercial Swiss cheese operations. For the purposes of the present invention, the process will be referred to hereinafter as a texturizing process for sliced Swiss cheese to improve the same, i.e., to provide the slices with improved flavor and texture.

It is the principal object of the present invention to provide improved sliced Swiss cheese. It is also an object of the present invention to provide a simple, inexpensive process for improving the flavor and texture of sliced Swiss cheese. It is another object of the present invention to provide improved distribution of salt and moisture within sliced Swiss cheese. Further objects and advantages of the present invention will be apparent from a study of the following detailed description.

The present invention generally comprises contacting, after curing, sliced Swiss cheese with a suitable concentration of aqueous salt solution or brine and then wrapping the slices. The slices are held for a sufficient period of time for the brine to become substantially uniformly distributed in the slices.

Now considering the process of the present invention more particularly, the process comprises wrapping cured Swiss cheese slices of suitable thickness in the presence of brine. The Swiss cheese slices may be obtained from any suitable cured Swiss type cheese, i.e., block or wheel Swiss cheese, either salted or unsalted, prepared and cured in accordance with conventional Swiss type cheese make procedures, as previously described.

It is necessary for the purposes of the present invention that the cheese present a large surface area to the brine. In order to do this the cheese should be sliced to less than about ½ inch in thickness. In this connection the cheese can be sliced in a conventional manner into conventionally sized slices. Normally sliced Swiss cheese has a thickness of approximately ⅛ inch. During texturing, a large area of cheese will be in contact with the brine so that the brine can be readily absorbed without providing unsightly packages and unsatisfactory packaging conditions.

In accordance with the present invention, the cheese slices of suitable shape and thickness are contacted with brine solution by dipping or by spraying or injecting of brine into the package. The material for the package may be any suitable moisture resistant packaging material, for example, cellophane, polyvinyl chloride, polyvinyl acetate, or like plastic material which is attractive in appearance, sufficiently flexible, durable, moisture-resistant and gas-resistant. Saran is the trade name or generic term referring to thermoplastic resins produced by the polymerization of vinylidene chloride alone or with other monomers. Saran utilized in the form of a thin film or sheet for purposes of wrapping is well known. Conventional cheese packaging materials, in addition to those indicated above, and which have these properties are suitable.

The cheese packages of this invention are preferably packaged in accordance with the patent to Coffey et al., Patent No. 2,955,045.

As indicated, the contacting of the block Swiss type cheese slices with the brine can be initiated in various ways. As indicated, the cheese slices can be dipped into a brine solution containing a suitable concentration of sodium chloride in water, then can be removed from the brine solution and wrapped. Alternatively, the cheese slices can be sprayed with a suitable solution of brine. However, it is preferred for most purposes to introduce the brine into contact with the cheese slices while the cheese slices are already disposed within a suitable wrapper of material, as previously indicated.

For example, in the packaging of the cheese slices after manufacture, curing and slicing, the cheese slices may first be wrapped in Saran, or other suitable packaging material, then flushed with a suitable gas to drive out most or substantially all oxygen. Some time before, during or after the flushing operation and before sealing a controlled quantity of brine may be introduced into the package and into contact with the cheese slices. The introduction can be readily carried out during the high speed packaging of the slices. Thus, initially, the brine can be free solution in the package.

A brine of any suitable concentration can be utilized. The brine may be a saturated salt solution. The amount of brine utilized in contact with the block Swiss type cheese slices is carefully controlled to adjust the final moisture content of the cheese to below about 42 percent by weight concentration to assure the desired brine pick-up by the cheese. The usual moisture content of block Swiss cheese is about 38–39 percent but in the practice of this invention the cured cheese should not have a moisture content of less than about 35 percent.

The amount of salt (sodium chloride) introduced in the brine is desirably controlled to increase the salt concentration of the cheese to not more than about 2 percent by weight.

The brine temperature utilized during contacting of the cheese should be below about 75 to 80° F., but, in any event, the temperature of the brine should not cause texture changes in the cheese.
the cheese should be below about 75 to 80° F., but, in the present process seems to effect substantially equal distribution of the salt throughout the body of the cheese slices. It is well known, for example, that in high quality wheel Swiss cheese that there is usually a substantial salt concentration gradient of from a high salt level on the surface of the cheese to a low salt level at the center of the cheese. The is also true to a smaller extent with respect to most large blocks of Swiss cheese. Moreover, there usually is a lower moisture level at the surface of the cheese than at the center thereof. Obviously, it is desirable to equalize the salt and moisture throughout the cheese slices so that they have more uniform flavor and texture characteristics. This is in part accomplished by the extended contact of the cheese slices with the controlled concentration of brine, in the process of the present invention.

The sliced surface should have open pores to permit absorption of the moisture and should be hydrophilic in character. In various slicing operations, the surface becomes hydrophobic in character so that moisture is not picked up by the cheese. This may be caused by the cutting knife heating up, thereby glazing fat over the faces of the slices, by cutting overly warm cheese, or by using particular cutting knives which effect a hydrophobic surface on the cheese slices. The character of the surface can be readily tested by placing drops of brine on the surface and observing the moisture absorption by a slice of cheese.

After a controlled concentration of brine is placed into contact with the cheese slices and such slices are wrapped in a suitable moisture-resistant wrapper, as previously described, and preferably after flushing of the wrapper with suitable gas, the package may be sealed. The sealing operation can be carried out on the wrapper in accordance with any suitable conventional procedure, as by heat sealing in the case of thermoplastic films, such as Saran, polyvinyl chloride or the like. Adhesives may be used to join together appropriate surfaces of the wrapper, etc. The sealing is carried out in such a manner that the brine does not escape from the package so formed, and so that the cheese is effectively protected.

In accordance with the present invention, after the brine and cheese slices are sealed within the wrapper, the thus formed package is held at a suitable temperature below the melting point of the cheese, preferably 65° F. or below, for a period of time sufficiently long to assure that substantially all of the brine is absorbed by the cheese slices. Such brine absorption should occur within fourteen days.

At the end of the holding period, for optimal consumer acceptability the cheese slices should present the usual appearance of untreated block Swiss cheese slices, no excessive amounts of free moisture being detectable. Obviously, the rate of absorption of moisture by the cheese slices during the holding period will vary and will be in part controlled by the initial condition of the slices (whether they are rindless or not, etc.) by the concentration of salt in the brine and the total amount of brine used, by the total surface area presented by the plurality of slices within the wrapper, the temperature at which the wrapped slices are held during the holding period, etc. During the holding period, there is a gradual readjustment of the salt and moisture concentrations within the body of the respective cheese slices. The salt and moisture concentrations tend to even out throughout the cheese, the presence of moisture in the form of brine facilitating this readjustment in the cheese. Moreover, the flavor and texture characteristics are changed so that the cheese becomes more desirable.

Further features of the present invention are set forth in the following examples.

*Example 1*

Cured rindless block Swiss cheese, prepared in accordance with United States Letters Patent No. 2,494,636 to Stine, was treated in accordance with the process of the present invention. The cured block of Swiss cheese comprising about 38.0 percent moisture and about 0.36 percent salt, was cut into ⅛″ thick rectangular slices. Each slice had a width of about 4 inches and a length of about 7 inches, and its surface displayed good hydrophilic properties.

Four slices of the rindless cured block Swiss cheese (about 8 ounces) were then contacted with 3 milliliters of a 27 percent brine solution at approximately 50° F., by first wrapping the slices in polyethylene film, and introducing the brine into contact with the slices within the film wrapper. The film was sealed, and the sealed package was held at about 55° F. for 17 days.

The individual Swiss cheese slices within the package had moisture and salt levels as set forth in the following table:

| Slice No. | Moisture, percent | Salt, percent |
| --- | --- | --- |
| 1 | 38.2 | 0.9 |
| 2 | 37.9 | .82 |
| 3 | 37.8 | .83 |
| 4 | 38.5 | .84 |

Example II

Rindless block Swiss cheese was treated in the same manner as in Example I, except that 9 milliliters of a 27 percent brine solution was introduced into contact with the slices within the film wrapper. After 17 days, there was no liquid brine apparent within the package, and the individual Swiss cheese slices within the package had moisture and salt levels as set forth in the following table:

| Slice No. | Moisture, percent | Salt, perent |
|---|---|---|
| 1 | 38.5 | 1.13 |
| 2 | 38.4 | 1.16 |
| 3 | 38.9 | 1.14 |
| 4 | 39.3 | 1.18 |

Example III

Rindless block Swiss cheese was treated in the same manner as in Example I, except that 12 milliliters of a 27 percent brine solution was introduced into contact with the slices within the film wrapper. After 17 days, there was no liquid brine apparent within the package, and the individual Swiss cheese slices within the package had moisture and salt levels as set forth in the following table:

| Slice No. | Moisture, percent | Salt, percent |
|---|---|---|
| 1 | 38.2 | 1.42 |
| 2 | 38.6 | 1.37 |
| 3 | 39.1 | 1.48 |
| 4 | 40.7 | 1.55 |

Example IV

Rindless block Swiss cheese was treated in the same manner as in Example I, except that 6 milliliters of a 27 percent brine solution (about 6.4 percent by weight of the slices) was introduced into contact with the slices within the film wrapper. After 17 days, there was no liquid brine apparent within the package, and the individual Swiss cheese slices within the package had moisture and salt levels as set forth in the following table:

| Slice No. | Moisture, percent | Salt, percent |
|---|---|---|
| 1 | 38.8 | 1.61 |
| 2 | 39.4 | 1.79 |
| 3 | 39.9 | 1.89 |
| 4 | 41.8 | 1.80 |

The preceding examples clearly illustrate the simplicity of the process of the present invention, the substantial advantages provided thereby, and certain unique characteristics of the process. Swiss cheese can be manufactured in accordance with modern practice, in an economical manner by the block technique. The cheese can be effectively treated to improve the flavor and texture thereof, and the salt and moisture redistributed therein so that a highly acceptable product is obtained. Accordingly, the substantial advantages of Swiss cheese manufactured by the block procedure can be retained, while still providing the distinctive flavor and texture of Swiss cheese. This is believed to be an important advance in the cheese-making art and is provided in a manner which need not interfere with commercial packaging and handling of the cheese. Further advantages of the present invention are set forth in the foregoing.

Such modifications in the steps of the present process, in the equipment and materials for carrying out the steps and in the product provided thereby as are within the skill of those versed in the art are contemplated as being within the scope of the present invention.

Various features of the present invention are set forth in the following claims.

What is claimed is:

1. A process for texturizing sliced Swiss type cheese to improve the same, which comprises the steps of preparing Swiss cheese slices with hydrophilic surfaces and having a thickness of less than about one-half inch, contacting said slices with an aqueous salt solution, wrapping said slices, sealing said slices in said wrapping together with said aqueous salt solution, and thereafter holding said wrapped slices until said aqueous salt solution is substantially completely absorbed by said slices, said salt solution comprising up to about six percent by weight of said slices.

2. A process for texturizing sliced Swiss type cheese to improve the same, which comprises the steps of preparing Swiss cheese slices with hydrophilic surfaces and having a thickness of less than about one-half inch, contacting said slices with an aqueous salt solution, wrapping said slices with a moisture-resistant flexible packaging material, sealing said slices in said packaging material together with said aqueous salt solution, and thereafter holding said wrapped slices until said aqueous salt solution is substantially completely absorbed by said slices, said salt solution comprising up to about six percent by weight of said slices.

3. A process for texturizing sliced Swiss type cheese to improve the same, which comprises the steps of preparing Swiss cheese slices with hydrophilic surfaces and having a thickness of about one-eighth inch, contacting said slices with an aqueous salt solution, wrapping said slices with a moisture-resistant flexible packaging material, sealing said slices in said packaging material together with said aqueous salt solution, and thereafter holding said wrapped slices until said aqueous salt solution is substantially completely absorbed by said slices, said salt solution comprising up to about six percent by weight of said slices.

4. A process for texturizing sliced block Swiss type cheese to improve the same, which comprises the steps of preparing Swiss cheese slices with hydrophilic surfaces and having a thickness of about one-eighth inch, contacting said slices with an aqueous salt solution, wrapping said slices with a moisture-resistant flexible packaging material, sealing said slices in said packaging material together with said aqueous salt solution, and thereafter holding said wrapped slices until said aqueous salt solution is substantially completely absorbed by said slices, said salt solution comprising up to about six percent by weight of said slices.

5. A process for texturizing sliced block Swiss type cheese to improve the same, which comprises the steps of preparing Swiss cheese slices with hydrophilic surfaces and having a thickness of about one-eighth inch, contacting said slices with a moisture-resistant flexible packaging material, sealing said slices in said packaging material together with said aqueous salt solution, and thereafter holding said wrapped slices at a temperature below the melting point of said slices until said aqueous salt solution is substantially completely absorbed by said slices, said salt solution comprising up to about six percent by weight of said slices.

References Cited in the file of this patent

UNITED STATES PATENTS 2,865,764    Gorsica et al.            Dec. 23, 1958

UNITED STATES PATENT OFFICE
CERTIFICATE OF CORRECTION

Patent No. 3,046,140                                                   July 24, 1962

Eugene J. Hermann

It is hereby certified that error appears in the above numbered patent requiring correction and that the said Letters Patent should read as corrected below.

Column 3, line 48, for "the cheese should be below about 75 to 80° F., but, in " read -- The addition of moisture in the brine to the cheese in --; as the beginning of a new paragraph; column 5, line 3, for "9" read -- 6 --; line 20, for "12" read -- 9 --; same column 5, line 38, for "6" read -- 12 --.

Signed and sealed this 11th day of December 1962.

(SEAL)
Attest:

ERNEST W. SWIDER                                              DAVID L. LADD
Attesting Officer                                                Commissioner of Patents